United States Patent [19]
Jones, Sr.

[11] 3,970,012
[45] July 20, 1976

[54] SOIL AGITATING DEVICE

[76] Inventor: Donald F. Jones, Sr., Warren, Minn. 56762

[22] Filed: Feb. 21, 1975

[21] Appl. No.: 551,971

[52] U.S. Cl. .................................. 111/6; 172/69; 172/112; 172/307; 172/484; 172/520; 172/540; 172/729

[51] Int. Cl.² ............... A01C 23/02; A01B 49/06; A01B 33/02

[58] Field of Search ............ 172/69, 112, 123, 307, 172/484, 518, 520, 540, 543, 613, 685, 687, 714, 727, 729; 111/6

[56] References Cited
UNITED STATES PATENTS

| | | | |
|---|---|---|---|
| 2,751,834 | 6/1956 | Hines, Sr. et al. | 172/307 X |
| 3,029,879 | 4/1962 | Wells, Jr. | 172/112 X |
| 3,194,194 | 7/1965 | Phelps | 111/6 |
| 3,327,786 | 6/1967 | Meyer | 172/307 X |
| 3,367,293 | 2/1968 | Cox | 111/6 |
| 3,557,880 | 1/1971 | Van Der Lely | 172/112 X |
| 3,708,019 | 1/1973 | Ryan | 172/484 X |
| 3,741,137 | 6/1973 | Eisenhardt | 111/6 |

FOREIGN PATENTS OR APPLICATIONS

| | | | |
|---|---|---|---|
| 24,168 | 8/1950 | Finland | 172/69 |
| 553,987 | 1/1957 | Italy | 172/69 |
| 96,740 | 7/1960 | Norway | 172/112 |

*Primary Examiner*—Richard C. Pinkham
*Assistant Examiner*—Richard T. Stouffer
*Attorney, Agent, or Firm*—Clarence A. O'Brien; Harvey B. Jacobson

[57] ABSTRACT

An elongated downwardly opening housing is provided for lengthwise advancement over the ground and includes mounting structure for dependingly supporting the housing from a farm implement tool bar. The housing includes front and rear transverse journaled horizontal shafts each having a pair of axially spaced circumferentially spiked wheels mounted thereon for rotation therewith. Corresponding ends of the shafts project outwardly through opposite sides of the housing and have aligned sprocket wheels mounted thereon. The sprocket wheel carried by the forward shaft is at least slightly greater in diameter than the sprocket wheel carried by the rear shaft and an endless chain is trained over the sprocket wheels drivingly connecting the forward shaft or front shaft to the rear shaft. As the housing moves over the ground along rows in which crops are to be planted the spiked wheels or disks carried by the front shaft are turned by their engagement with the ground and the soil over which the spiked disks carried by the front shaft roll is loosened. Then, as the same strip of ground surface is contacted by the spiked disks carried by the faster rotating rear shaft, the loosened soil is further loosened and mulched. In addition to this structure, the housing includes a sheet of flexible resilient material extending between the sides of the housing forming the front, top, and rear walls therefor. At the rear end of the housing, this sheet of material projects downwardly below the sides of the housing to define a flexible ground sweep. Additionally, the housing is provided with chemical spray discharge structure whereby a suitable weed retardant or other chemical may be sprayed onto the ground or soil being acted upon by the spiked disks carried by the front shaft. One form of the invention disclosed is mounted for vertical floating movement to compensate for irregular ground surfaces and includes adjustable ground engaging gauge wheels.

6 Claims, 6 Drawing Figures

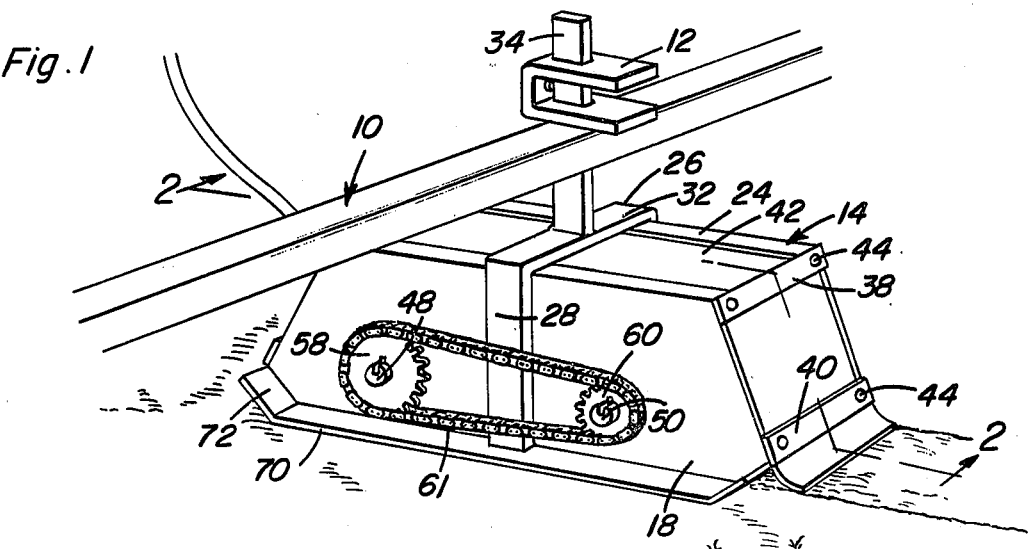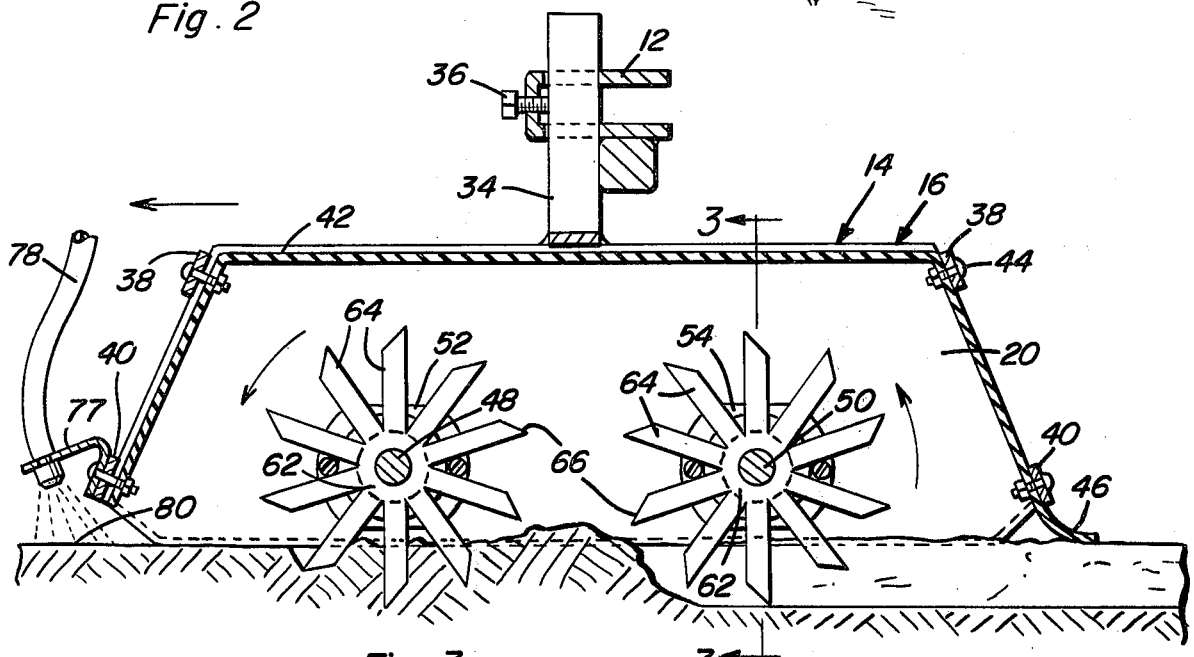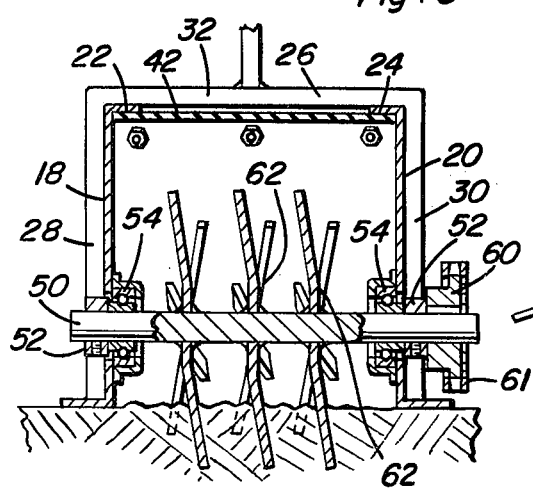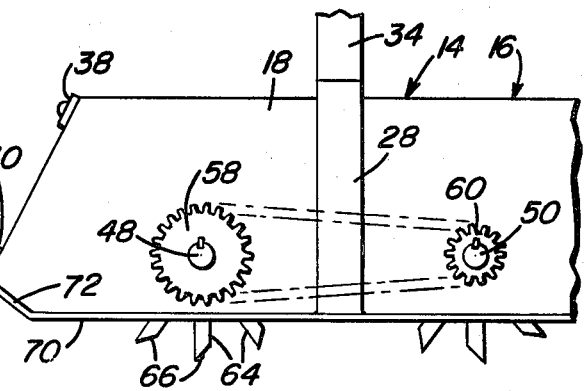

SOIL AGITATING DEVICE

BACKGROUND OF THE INVENTION

Soil mixing and agitating devices have been heretofore designed and examples of such previously known devices may be found in U.S. Pat. Nos. 1,641,393, 2,881,848, 2,885,943, 3,194,193 and 3,194,194.

However, these previously known soil mixing and agitating devices have included structural features which are not as desirable in some instances as the similar but different structural features of the soil agitating device of the instant invention.

BRIEF DESCRIPTION OF THE INVENTION

The soil agitating device of the instant invention includes a forward shaft provided with axially spaced circumferentially spiked disks designed to roll over and bite into the ground upon forward movement of the agitating device along rows in which crops are to be planted. The spiked disks carried by the forward shaft loosen the ground and the front shaft drives a rear shaft at a slightly greater speed which also carries a plurality of axially spaced spiked disks for acting upon the same strip of ground over which the spiked disks carried by the front shaft move. Because the rear shaft rotates at a higher speed than the front shaft and the soil acted upon by the spiked disks of the rear shaft has already been loosened by the spiked disks of the front shaft the rear shaft spiked disks are capable of more completely agitating and mixing the soil over which they pass and function in a more complete manner to mix weed retardant chemicals or fertilizing chemicals sprayed onto the ground into the soil being agitated.

The main object of this invention is to provide a soil agitating device which may be supported from an implement tool bar and moved over the surface of the ground along rows in which crops are to be planted in a manner to completely agitate and break up the soil over which the invention is moved.

Another object of this invention, in accordance with the immediately preceding object, is to provide an agitating device which may be used in conjunction with a chemical spraying apparatus to thoroughly mix a selected chemical into the ground being agitated by the soil agitating device.

Yet another object of this invention is to provide a soil agitating device in accordance with the preceding objects and constructed in a manner whereby it may be moved smoothly along rows in which crops are to be planted without offering considerable friction resistance to movement of the supporting tool bar.

A final object of this invention to be specifically enumerated herein is to provide a soil agitating device in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of a first form of soil agitating device of the instant invention shown supported from an implement tool bar;

FIG. 2 is an enlarged vertical sectional view taken substantially upon the plane indicated by the section line 2—2 of FIG. 1;

FIG. 3 is a transverse vertical sectional view taken substantially upon the plane indicated by the section line 3—3 of FIG. 2;

FIG. 4 is a fragmentary side elevational view of the soil agitating device as seen from the left side thereof and with the drive chain thereof removed to more clearly illustrate the size relationship of the shaft mounted sprocket wheels of the invention;

DETAILED DESCRIPTION OF THE INVENTION

Figure 5:
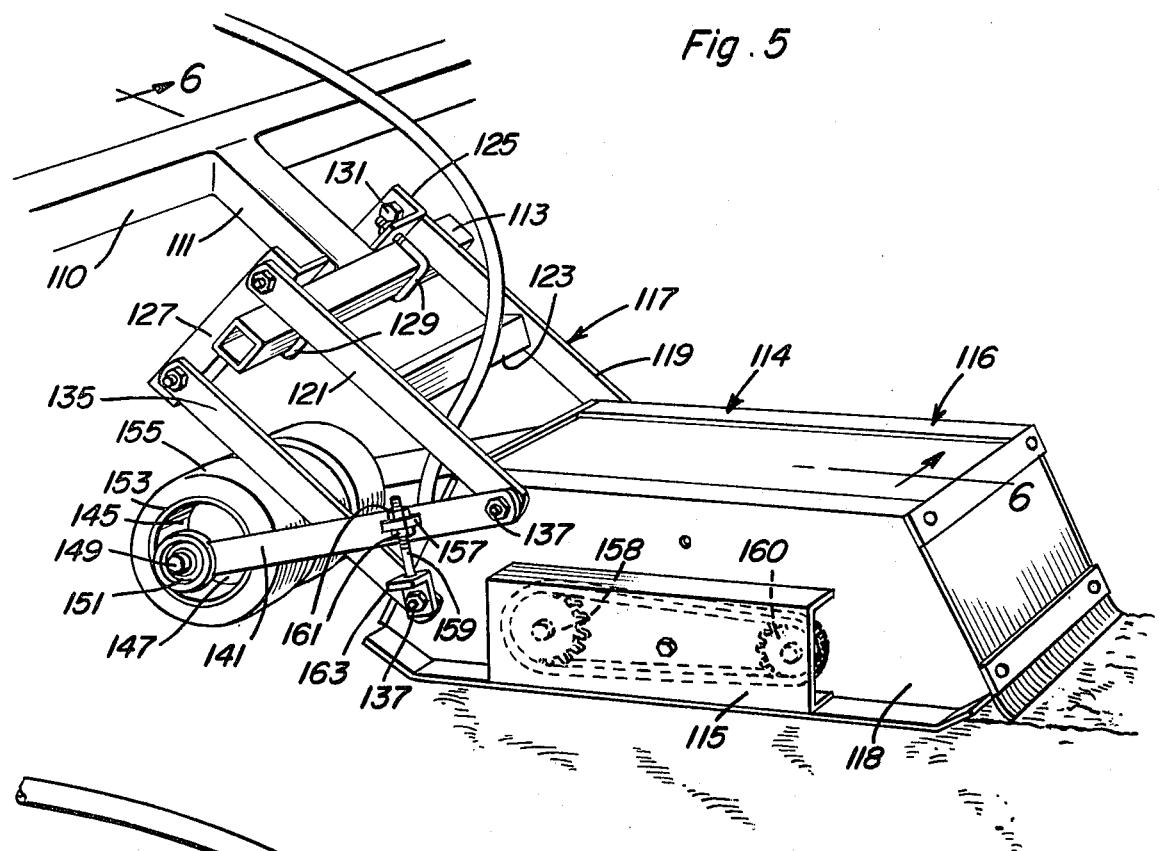
FIG. 5 is a perspective view similar to FIG. 1, but of a second form of the invention including a floating mount and an adjustable gauge wheel structure.

Referring now more specifically to FIGS. 1–4 of the drawings, the numeral 10 generally designates a farm implement tool bar from which a clamp structure 12 is rigidly supported in any convenient manner by welding.

The first form of soil agitating device of the instant invention is referred to in general by the reference numeral 14 and includes a housing referred to in general by the reference number 16. The housing 16 includes a pair of opposite longitudinal side walls 18 and 20 including upper marginal inwardly directed flanges 22 and 24, respectively. The side walls or flanges 18 and 20 are rigidly interconnected by means of an inverted U-shaped frame 26 including a pair of upstanding opposite side legs 28 and 30 interconnected at their upper ends by means of a horizontal transverse bight portion 32. The legs 28 and 30 closely overlie, extend downwardly along and are secured to the outer surface portions of the longitudinal mid-portions of the side walls 18 and 20 and the opposite ends of the bight portion 32 are secured to the longitudinal mid-portions of the flanges 22 and 24. An upright post 34 is provided and the lower end thereof is rigidly secured to the mid-portion of the bight portion 32 in any convenient manner such as by welding and the upper end of the post 34 is removably supported from the clamp structure 12 in vertically adjusted position by means of a threaded clamp screw or bolt 36.

The front and rear marginal portions of the side walls 18 and 20 are upwardly convergent and upper and lower transverse braces 38 and 40 extend between and rigidly connect corresponding upper and lower portions of the upwardly convergent front and rear marginal edges of the side walls 18 and 20.

A length of rubberized belting or a rubberized strip 42 is provided and closes the upper portion of the housing 16 with the opposite marginal edges of the mid-portion of the strip or belting 42 closely underlying the flanges 22 and 24. The opposite ends of the belting or strip 42 extend downwardly between the upwardly convergent corresponding front and rear ends of the side walls 18 and 20 and are attached at points spaced along their opposite side marginal portions to the opposite ends of the corresponding transverse braces 38 and 40 by means of suitable fasteners 44. In addition, the rear end portion of the strip or belting 42 includes a downward extension 46 which extends downwardly to a level below the lower marginal edges of the side walls 18 and 20 and forms a flexible sweep for moving over the ground acted upon by the agitating device 14.

Front and rear shafts 48 and 50 extend transversely between and are journaled from the side walls 18 and 20 by means of journal bearing structures 52 and 54, respectively, supported from the inner sides of the side walls 18 and 20. The side walls 18 and 20 are provided with apertures through which the opposite ends of the shafts 48 and 50 are received and each shaft end includes a stop collar 56 mounted thereon opposing the corresponding bearing assembly.

The left-hand ends of the shafts 48 and 50 have large and small diameter sprocket wheels 58 and 60, respectively, mounted thereon for rotation therewith and an endless chain 61 is trained about the sprocket wheels 58 and 60 whereby the front shaft 48 is drivingly coupled to the rear shaft 50.

Each of the shafts 48 and 50 is provided with a plurality of axially spaced peripherally spiked disks 62 welded in position thereon and the spikes 64 of each disk 62 include sharpened outer ends 66 for biting into the ground. The free ends of the lower spikes 64 project considerably below the lower marginal edge portions of the side walls 18 and 20 and the side wall lower marginal edge portions are provided with exteriorly mounted strap-type skids 70 including forwardly and upwardly inclined forward ends 72.

The front end of the housing 16 has a spray nozzle 76 supported from the brace 40 by means of a bracket 77, and the spray nozzle 76 is positioned to direct a spray rearwardly and downwardly upon the ground over which the spikes 64 of the disks 62 carried by the shaft 48 are to be passed. The discharge end of a liquid chemical supply line 78 is connected to the nozzle or nozzle structure 76 for supplying chemicals under pressure to the nozzle 76.

In operation, the soil agitating device 14 is moved over the surface of the ground 80 between adjacent rows of crops and as the device 14 moves over the ground 80 the spiked disks 62 carried by the front shaft 48 roll over and bite into the ground 80 in order to loosen the same. Of course, this causes rotation of the shaft 48 and the shaft 48 drives the shaft 50 at a slightly greater rotational speed whereby the disks 62 carried by the rear shaft 50 rotate at speeds greater than ground speed to further agitate and mulch the soil acted upon by the disks 62 supported from the front shaft 48. The extension 46 functions to smooth out the surface of the agitated and mulched soil acted upon by the soil agitating device 14 and the nozzle 76 may be utilized to downwardly direct a chemical spray upon the ground or soil 80 being acted upon by the disks 62 carried by the shaft 48. Any suitable chemicals may be discharged through the nozzle 76 and such suitable chemicals may include weed retardant chemicals as well as plant fertilizing chemicals.

Figure 6:
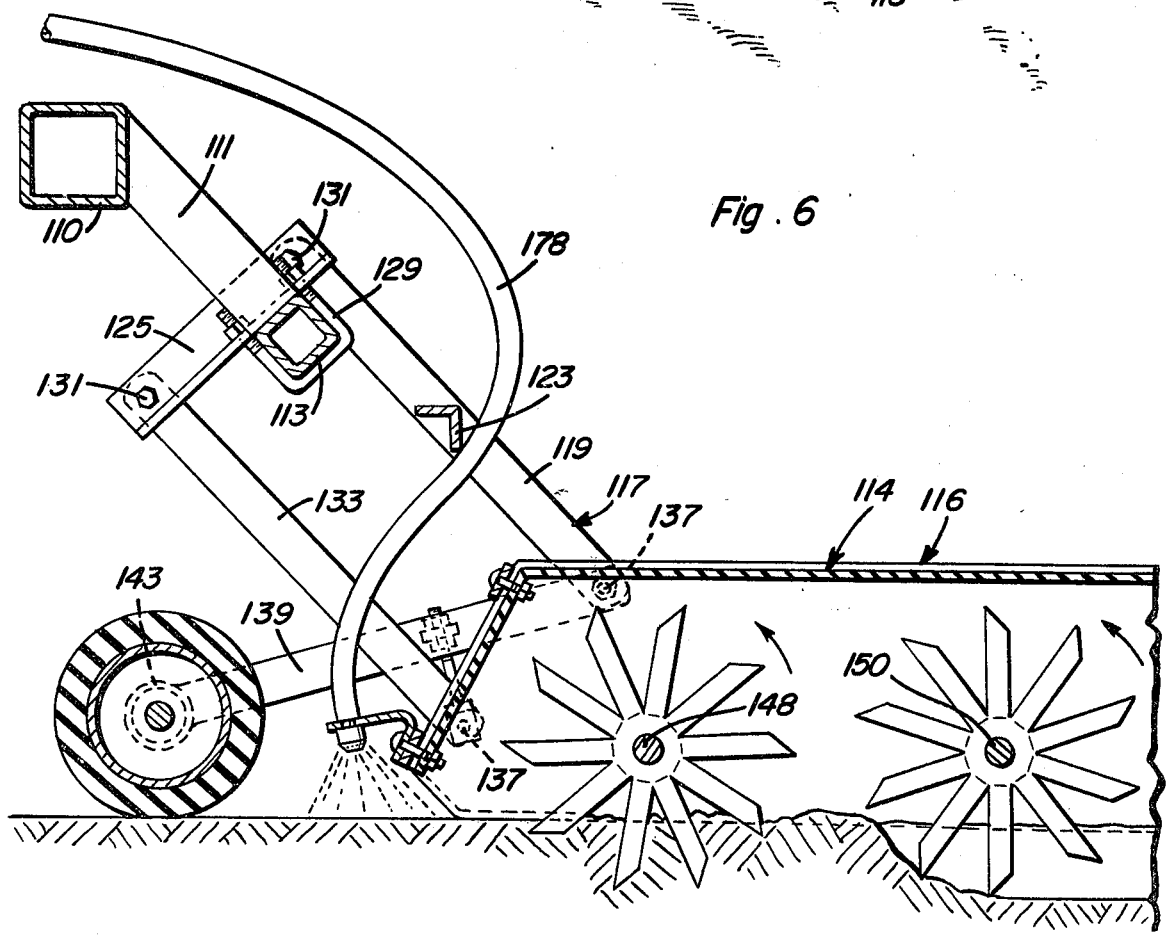
FIG. 6 is an enlarged fragmentary vertical sectional view taken substantially upon the section line 6—6 of FIG. 5.

Referring now more specifically to FIGS. 5 and 6 of the drawings, there will be seen a modified form of soil agitating device referred to in general by the reference numeral 114 and including various structural features thereof which are substantially identical to certain structural features of the device 14. Those components of the device of 114 comprising substantial duplicates of corresponding components of the device 14 are referred to by reference numerals in the 100 series corresponding to those reference numerals applied to the substantially identical components of the device 14.

The device 114 includes a horizontal inwardly opening and generally channel-shaped cover 115 which is secured to the side wall 118 so as to at least substantially enclose the sprocket wheels 150 and 158 as well as the chain 162. In addition, the device 114 does not include a mounting frame corresponding to the frame 26 of the device 114. Rather, the tool bar 110 from which the device 114 is supported includes a rearwardly and downwardly inclined support arm 111 equipped with a horizontal transverse cross head 113 at its free end and a parallelogram linkage assembly referred to in general by the reference numeral 117 is provided for supporting the device 114 from the cross head 113.

The linkage assemblage 117 includes a first pair of parallel links 119 and 121 rigidly interconnected intermediate their opposite ends by means of a transverse brace 123 extending and secured between the links 119 and 121. A pair of angle brackets 125 and 127 are clamped, by means of U-bolts, to opposite end portions of the cross head 113 and the angle brackets 125 and 127 are disposed normal to a rearwardly and downwardly inclined plane containing the support arm 111 and the cross head 113.

The upper forward ends of the links 119 and 121 are pivotally attached, as by means of pivot fasteners 131, to the upper ends of the angle brackets 125 and 127 and the upper ends of a second pair of links 133 and 135 are pivotally attached to the lower ends of the angle brackets 125 and 127 by means of an additional pair of pivot fasteners 131. The lower ends of the links 119 and 121 are pivotally attached to opposite sides of the upper forward corner of the housing 116 by means of pivot fasteners 137 and the lower ends of the links 133 and 135 are pivotally attached to opposite side lower forward portions of the housing 116 by means of additional pivot fasteners 137. Thus, it may be seen that the housing 116 may float vertically relative to the cross head 113 by means of the links and pivotal connections defining the parallelogram linkage assembly 117. Furthermore, a pair of opposite side forwardly and downwardly inclined support arms 139 and 141 have their rear ends pivotally supported from the pivot fasteners 137. The lower forward ends of the support arms 139 and 141 carry a pair of aligned bearing housings 143 and a support drum 145 including inwardly offset opposite end walls 147 has an axial shaft 149 secured therethrough and to the end walls 147. The ends of the shaft 149 are journaled in bearing assemblies 151 carried by the bearing housings 143 and the opposite end portions of the drum 145 have radially outwardly projecting circumferentially extending retaining rings 153 secured thereto between which three semi-pneumatic tire casings 155 are mounted.

The end portions of the support arms 139 and 141 remote from the bearing housings 143 include oppositely projecting apertured mounting lugs 157 through which the upper ends of threaded shank portions 159 are adjustably secured by means of threaded nuts 161 and the lower ends of the threaded shanks 159 include angle brackets 163 having their upstanding flange portions pivotally supported from the corresponding lower pivot fasteners 137.

In operation, the soil agitating devices 114 operate in substantially the same manner as the soil agitating devices 14. However, the devices 114 may float vertically relative to the associated tool bar 110 and the threaded shank portions 159 may be adjusted downwardly from the positions thereof illustrated in FIGS. 5 and 6 of the drawings in order to slightly raise the housing 116 and the spiked disks 162 relative to the surface of the ground over which the housing 116 is being moved, the wheels 155 serving as depth gauge wheels and allowing the device 114 to readily conform to irregular ground surfaces.

The housing 116 is illustrated in FIGS. 5 and 6 of the drawings in its lowest position relative to the tool bar 110. The abutting engagement of the links 119 and 121 with the rearwardly and upwardly facing surface of the cross head 113 prevents further downward swinging movement of the rear ends of the links 119 and 121 from the positions thereof illustrated in FIGS. 5 and 6. Additionally, the abutting engagement of the links 119 and 121 with opposite end portions of the cross head 113 enables the device 114 to be elevated completely clear of the ground when the tool bar 110 is elevated relative to the ground.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A soil working apparatus for support from a farm implement support member and movement along the ground in contact with the latter, said apparatus comprising a downwardly opening housing defining front and rear ends and including opposite side walls, front and rear transverse shafts extending between and journaled from said side walls, said shafts each including generally radially outwardly projecting and circumferentially axially spaced ground impaling spikes supported therefrom for rotation therewith, the lower end portions of the lower spikes on said shafts projecting downwardly below the lower marginal portions of said side walls, and means drivingly connecting said front shaft to said rear shaft for rotation of the latter in response to rotation of the front shaft and at a slightly greater angular speed than the angular speed of rotation of said front shaft, said side walls including corresponding upper marginal edges and corresponding upstanding front and rear marginal edges, said front and rear edges being rearwardly and forwardly upwardly inclined, respectively, upper and lower transverse braces extending between and secured to corresponding upper and lower end portions of said edges, said housing including a top wall extending between said upper marginal edges of said side walls and having the opposite end portions thereof disposed between and supported from said upper transverse braces, corresponding ends of said walls including front and rear end walls extending therebetween, said top wall comprising a sheet of flexible resilient material, said end walls comprising opposite end downwardly directed integral end portions of said sheet of flexible resilient material with the lower end portions thereof disposed between and supported from said lower braces, the terminal lower end of said rear end wall projecting downwardly below the marginal edges of said side walls and defining a flexible ground sweep.

2. The combination of claim 1 wherein said means drivingly connecting said front shaft to said rear shaft comprises a pair of large and small diameter sprocket wheels mounted on said front and rear shafts, respectively, for rotation therewith, and an endless chain trained about said sprocket wheels.

3. The combination of claim 2 wherein said shafts project through one of said side walls, said sprocket wheels being mounted on said shafts outwardly of said one side wall.

4. The combination of claim 1 including spray discharge nozzle means carried by forward portion of said housing and positioned forwardly of and to the exterior of said front end wall to direct a downward spray on the ground closely forward of the front end wall.

5. The combination of claim 1 including a tool support structure, rearwardly and downwardly inclined upper and lower parallel links pivotally supported at their upper forward portions from said support structure, said housing being pivotally supported from the lower rear portions of said parallel links for vertical floating relative to said tool support structure, a forwardly and downwardly inclined support arm pivoted at its upper rear end from said housing for oscillation about a horizontal axis coinciding with the axis of oscillation of the rear lower portion of the upper link relative to said housing, the forward lower end of said support arm having ground engaging gauge wheel means journaled therefrom, and upstanding adjustable length elongated connecting means connected between a mid-portion of said support arm and the forward end of said housing.

6. The combination of claim 5 wherein said tool support structure and parallel links include coacting movement limiting means preventing downward swinging of the lower rear portion of said parallel links, and thus said housing below a predetermined point relative to said tool support structure.

* * * * *